US008978503B2

United States Patent
Dort et al.

(10) Patent No.: US 8,978,503 B2
(45) Date of Patent: Mar. 17, 2015

(54) METHOD FOR DETERMINING GEOMETRY DATA FOR A FIRST BEVEL GEAR IN A BEVEL GEAR DRIVE, AND BEVEL GEAR DRIVE WHICH HAS A FIRST AND A SECOND BEVEL GEAR

(75) Inventors: Florian Dort, Bad Wörishofen (DE); Carsten Hamm, Erlangen (DE); Wolfgang Papiernik, Neunkirchen (DE); Tomas Sauer, Feucht (DE); Andreas Uhlich, Wendelstein (DE)

(73) Assignee: Siemens Aktiengesellschaft, München (DE)

( * ) Notice: Subject to any disclaimer, the term of this patent is extended or adjusted under 35 U.S.C. 154(b) by 352 days.

(21) Appl. No.: 13/366,969

(22) Filed: Feb. 6, 2012

(65) Prior Publication Data

US 2013/0031994 A1 Feb. 7, 2013

(30) Foreign Application Priority Data

Feb. 7, 2011 (EP) .................................. 11153532

(51) Int. Cl.
*F16H 1/14* (2006.01)
*B23F 5/20* (2006.01)
*F16H 55/08* (2006.01)

(52) U.S. Cl.
CPC .............. *B23F 5/20* (2013.01); *F16H 55/0813* (2013.01)
USPC ................................ 74/459.5; 74/423; 74/443

(58) Field of Classification Search
CPC .................................................. F16H 55/0813
USPC ........................................ 74/459.5, 423, 443
See application file for complete search history.

(56) References Cited

U.S. PATENT DOCUMENTS 8,070,640 B2 * 12/2011 Radzevich ..................... 475/230

FOREIGN PATENT DOCUMENTS

EP 1773530 B1 1/2008

OTHER PUBLICATIONS

G. Niemann, H. Winter: "Maschinenelemente Band II", Springer Verlag, Berlin, 1985, pp. 32-35 (=Kap. 21.12); Book; 1985.
G. Bär: Explicit Calculation Methods for Conjugate Profiles, In: Journal for Geometry and Graphics, vol. 7 (2003), No. 2, pp. 201-210; Book; 2003.
A. Johann, J. Scheurle: "On the generation of conjugate flanks for arbitrary gear geometries", In: GAMM-Mitteilungen, vol. 32 (2009), Heft 1, pp. 61-79; Book; 2009.

(Continued)

*Primary Examiner* — William Kelleher
*Assistant Examiner* — Terence Boes
(74) *Attorney, Agent, or Firm* — Henry M. Feiereisen LLC (57) ABSTRACT

A bevel gear drive with two bevel gears rotates about respective rotation axes intersecting at an intersection point, forming an angle of intersection. A computer determines the tooth shape of these tooth flanks based on data other than a tooth shape. The data are characteristic for a particular contact path represented by a sequence of contact points. The tooth shape of the tooth flanks is determined for several contact paths, with the interacting tooth flanks at all contact points having a common normal, which passes through a pitch point located between the two rotation axes and spaced from the intersection point equal to the radius r. Geometry data for the bevel gear are determined from the shape of the tooth flanks and stored in a format suitable for automatically generating a parts program for a processing machine with at least five axes.

11 Claims, 5 Drawing Sheets

(56) References Cited

OTHER PUBLICATIONS

G. Niemann, H. Winter "Maschinenelemente Band III", Springer Verlag, Berlin, 1983, pp. 25-32 (=Kap. 24.3); Book; 1983.

J. Klingelnberg: "Kegelräder. Grundlagen, Anwendungen", Springer Verlag, Berlin, 2008, pp. 28-29 (=Kap. 2.2.4.1); Book; 2008.

A.K.Thomas: "Grundzüge der Verzahnung", Carl Hanser Verlag, München, 1957, pp. 28-29 (=Kap. 4.1); Book; 1957.

W.M. Schweicher. "Rechnerische Analyse und Optimierung des Beanspruchungsverfahrens bogenverzahnter Kegelräder", Dissertation RWTH Aachen, 1994; pp. 72-86 (=Kap. 7); Book; 1994.

V. Simon: Optimal Machine Tool Setting for Hypoid Gears Improving Load Distribution, ASME Journ. of Mechanical Design 123,2001.; Book; 2001.

Savage M. et al.: Tooth Contact Shift in Loaded Spiral Bevel Gears; Gear Technology, Randall Publishing Co. Elk Grove, Illinois, US, vol. 9, No. 6, Nov. 1, 1992, pp. 24-31; ISSN: 0743-6858; Others; 1992.

Figliolini et al.: Algorithms for involute and octoidal bevel gear generation; Journ.o.Mechanical Design, ASME International, US, vol. 127, Jan. 1, 2005, pp. 664-672; ISSN: 1050-0472.; Magazine; 2005.

Wiener, D.: Korrekturverfahren für Kegelradverzahnungen; Antriebstechnik, Vereinigte Fachverlage, Mainz, DE; vol. 39, Nr. 6, Jun. 1, 2000; pp. 36, 38-42; ISSN: 0788-6546.; Magazine; 2000.

"5-Achsen-Fräsen ersetzt klassisches Verzahnen"; Technische Rundschau, Haliwag AG, CH, vol. 102, No. 4, Apr. 16, 2010; pp. 63-66; ISSN: 1023-0823; Magazine; 2010.

\* cited by examiner

METHOD FOR DETERMINING GEOMETRY DATA FOR A FIRST BEVEL GEAR IN A BEVEL GEAR DRIVE, AND BEVEL GEAR DRIVE WHICH HAS A FIRST AND A SECOND BEVEL GEAR

CROSS-REFERENCES TO RELATED APPLICATIONS

This application claims the priority of European Patent Application, Serial No. EP11153532, filed Feb. 7, 2011, pursuant to 35 U.S.C. 119(a)-(d), the content of which is incorporated herein by reference in its entirety as if fully set forth herein.

BACKGROUND OF THE INVENTION

The present invention relates to a method for determining geometry data for a first bevel gear in a bevel gear drive which, in addition to the first bevel gear has a second bevel gear. The present invention furthermore relates to a bevel gear drive which has a first and a second bevel gear.

The following discussion of related art is provided to assist the reader in understanding the advantages of the invention, and is not to be construed as an admission that this related art is prior art to this invention.

A variety of gear drives exists in mechanical engineering, such as spur/cylindrical gear drives and bevel gear drives.

In the case of gear drives, two gears each rotate about their own axis of rotation. Both gears have teeth with tooth flanks via which the gears act on each other. Each tooth on the gears is in drive contact with a tooth on the other gear only during part of a rotation of the gear concerned.

If one of the gears is engaging with a particular tooth flank on one of its teeth on the other gear, it is possible that at any point in time only a point, or only a few points, on the tooth flank concerned are in contact with the other gear. This type of contact is commonly referred to in the prior art as point contact. Alternatively, it is possible that the contact concerned is made at one and the same point in time at a plurality of points on a tooth flank, where these points together form a line. This type of contact is commonly referred to in the prior art as linear contact. In the case of a linear contact, the torque which is to be transmitted from one gear to the other is distributed over a substantially greater area than in the case of a point contact. A consequence of this is a more even transmission of the force and a lower stress on the gears.

In the case of cylindrical gear drives, under optimal conditions two cylindrical gears lie in one plane and execute a rotational movement. Thus the axes of rotation are parallel to each other. The rotational movements are—depending on the nature of the cylindrical gear drive—in the same sense or in opposite senses. If one follows the movement of a pair of contact points—that is to say two points, one on the one gear and another on the other gear, which touch each other at a particular point in time—then each of the two points describes a circle in the one and same plane. The 'interrolling' movement can be investigated in this plane, and indeed independently of the width of the tooth. A view of this type is commonly referred to in the prior art as transverse section. Without loss of generality, a cylindrical gear drive can be investigated in a plane of this type. The problem involved is one of so-called planar kinematics.

The shape of the gears should be oriented around the interrolling action of the gear train. During the interrolling of the gears, there is contact between one tooth on each gear or between several teeth on each. Without loss of generality, it is possible to investigate the interactions between exactly one tooth on the drive input side and exactly one tooth on the drive output side. The region of a tooth which comes into contact during the interrolling is referred to below as the active flank.

For cylindrical gear drives, the conditions that the active flanks must satisfy in order to permit uninterrupted contact between the teeth in a transverse section have long been known.

If a cylindrical gear is viewed in a transverse section, then the active flank is a planar curve. This curve is referred to below as the tooth profile line. The geometric location, within the plane of investigation, at which the two tooth profile lines of the gear train contact each other, is referred to as the contact point. During the interrolling of the two gears against each other, the contact point moves along a contact path. This contact path is a characteristic contour. The planar law of gearing says that at the contact point the two tooth profile lines must have a common normal and that this normal must divide the distance between the two axes of rotation in the inverse (reciprocal) ratio to the rotational speeds. The point of intersection of the normal with the line connecting the two axes of rotation is commonly referred to as the pitch point.

The planar law of gearing establishes a direct connection, in a transverse section, between the contact path on the one hand and the tooth profile line on the other for a prescribed transmission ratio. This geometric connection can be translated into an explicit analytical calculation.

In the case of a cylindrical gear drive, the individual transverse sections can be investigated independently of one another. In particular, the planar law of gearing can also be satisfied in each transverse section. In the case of cylindrical gear drives it is therefore possible without further ado to achieve a linear contact. For the best-known solution, the so-called involute toothing, the contact path forms a straight line through the pitch point in the plane investigated.

By comparison with cylindrical gear drives, bevel gear drives have a substantially more complex interrolling geometry. A simple transference of the toothing derived for cylindrical gear drives to bevel gear drives is not possible without further considerations. In particular, bevel gear drives have two axes of rotation which intersect with each other. The angle of intersection, at which the two axes of rotation cut each other, can—within certain limits—be arbitrary. In theory and in practice the angle of intersection is often 90°. If one follows the movement of a pair of contact points, then it is true that in the case of a bevel gear drive each of these two contact points again describes a circle. However, unlike a cylindrical gear drive, these two circles do not lie in a common plane. The constant (and equal) distance from the two contact points to the point of intersection of the two axes of rotation has the consequence, however, that the two circles are located on a common spherical surface. Analogously to cylindrical gear drives, the interrolling can thus be investigated on this spherical surface independently of the tooth width. In what follows, a view of this nature will be referred to as a spherical section. Without loss of generality, the analysis can again be carried out for an infinitely thin tooth (that is, within the spherical section). One speaks of a problem of spherical kinematics.

Since the interrolling of the active flanks against each other does not represent a problem of planar kinematics, the planar law of gearing cannot be applied. The question then arises as to the arrangement of the active flanks of the bevel gears which will produce good running characteristics in the bevel gear drive.

In practice, the manufacture of bevel gears for bevel gear drives has been determined by historical developments. It is carried out using special machines and special tools, which are mainly responsible for the geometry of the bevel gear concerned. As a general rule, restrictions have applied which do not permit a free choice of the tooth forms. For example, the special machines can be subject to kinematic imperatives.

There are known theoretical considerations for the shape of bevel gear drives, which to some extent already investigate the active flanks in a spherical section.

In order to determine the geometry of the active flanks, in the prior art cited a flat countergear, a so-called planar gear, is made to interroll virtually. This planar gear has trapezoidal teeth—analogous to the involute gear teeth on cylindrical gears. One commonly refers to a trapezoidal reference profile. The toothing arrangement on the bevel gear which then results is referred to as octoidal toothing.

Furthermore, use can also be made of a simplification by which the investigation is not in the spherical section but instead on an auxiliary cone which stands orthogonally to the bevel gear. This approach is known in the prior art as Tredgold's approximation, which leads to a computational substitute toothing, by which the conditions in the contact region of the bevel gear drive are approximated by a cylindrical gear drive. The substitute cylindrical gear can thus again be investigated in individual transverse sections. Only this approximation has found its way into the practice of manufacturing technology.

In the practical manufacture of bevel gears, therefore, only an approximation is produced to the octoidal toothing known from theoretical considerations. Depending on the manufacturing process, the single and dual flank processing of a bevel gear does not lay down the profile in the spherical section, and it is not enlarged with increasing sphere radius. This results in a toothing profile which at any point in time still only has a point contact. As the trajectory of the contact point, a one-dimensional contact path is produced, the distance of which from the point of intersection of the two axes of rotation varies with the rotation of the bevel gears.

The manufacture of the active flanks by the unwinding of a spherical surface area to generate a so-called spherical involute has also already been discussed in the prior art. This approach corresponds to the geometric generation of the involute toothing of cylindrical gears by unwinding the circumference of a circle. Similar to using spherical kinematic solution approaches, the spherical involute form has however not been pursued further due to the manufacturing limitations on bevel gears.

With the present prior art, bevel gears are considered as fit to run if the law of gearing in the form of Tredgold's approximation is satisfied in a transverse section of the active flank at the instant of the interrolling. If one investigates the sequence of individual contact points during the interrolling, one obtains the contact path. However, the toothings permit only a point contact.

For optimizing the running characteristics of bevel gear drives, macro-geometry parameters of the toothing as, for example, the number of teeth, the module, tooth width, etc. have been varied in the prior art. Alternatively, settings of the basic manufacturing machinery and/or the axis parameters of a basic free-form machine can be varied. However, even when using all these optimizations, linear contact cannot be achieved.

It would therefore be desirable and advantageous to obviate prior art shortcomings and to provide an improved method and system for achieving a linear contact in a bevel gear drive when the bevel gears of the bevel gear drive interroll against each other.

SUMMARY OF THE INVENTION

According to one aspect of the present invention, a method for determining, in a bevel gear drive having a first bevel gear with a plurality of first teeth and a second bevel gear with a plurality of second teeth, with a computer geometry data of the first bevel gear, said first bevel gear in operation rotating about a first axis of rotation at a first rotation speed and said second bevel gear in operation rotating about a second axis of rotation at a second rotation speed, includes determining a tooth shape for first tooth flanks on the first teeth, which interact with second tooth flanks on the second teeth, based on data other than the tooth shape for first tooth flanks, wherein the data are associated with a plurality of contact paths computed for a corresponding plurality of radii centered at an axis intersection point. A contact path associated with a corresponding radius is represented by a sequence of contact points at which during rotation of the first and second bevel gears a first tooth flank operates on a corresponding second tooth flank. The method further includes determining for those radii that have an associated contact path, the tooth shape for the first tooth flanks associated with each of the radii, such that each of the first and second tooth flanks operating on each other have a common normal for that radius at all contact points relating to the particular radius, with the common normal passing through a pitch point associated with the particular radius, wherein the pitch point is located between the first and second axes of rotation at a distance from the axis intersection point equal to the particular radius and forms with the first axis of rotation a pitch angle according to the relationship $$\tan\gamma = \frac{\sin\delta}{\omega_1/\omega_2 + \cos\delta}.$$

$\gamma$ is here the pitch angle, $\delta$ is an angle of intersection between the first rotation axis and the second rotation axis, $\omega 1$ is the first rotation speed and $\omega 2$ the second rotation speed.

The geometry data for the first bevel gear are then determined based on the tooth shape determined for the first tooth flanks, whereafter the geometry data are storing in a format which allows automatic generation of a parts program for a processing machine with at least five axes, for manufacturing the first bevel gear.

With the inventive method therefore, a spherical toothing rule centered at the axis intersection point is proposed and is solved on surfaces which are spherical and centered at the axis intersection point. The individual solutions may be determined independently of one another. They may, when the determination is carried out in an orderly manner, be matched to one another in such a way that the tooth flanks which act on each other have a linear contact.

According to an advantageous feature of the present invention, the contact paths may—within certain limits—be freely determined and may vary from one radius to another. However, the core of the contact path is advantageously the same for all radii. The formulation "core of" means that for any two radii, for each of which a contact path is defined, one of the two contact paths can be mapped by scaling, centered at the axis intersection point, onto the other contact path or onto a section of the other contact path containing the pitch point of the other contact path.

The tooth shape of the first tooth flank, the tooth shape of the second tooth flank and the contact path may be—relative to an individual radius—one-to-one (in both directions) mappable one to the other. It is therefore not the only possibility that the data, which are characteristic of the contact paths relating to each particular radius from the plurality of radii centered at the axis intersection point, are the contact paths themselves. It is alternatively also possible that the appropriate data items are the tooth shape of the second tooth flanks.

According to an advantageous feature of the present invention, the contact paths may be located on a great circle, about the axis intersection point, which contains the relevant pitch point. This toothing corresponds to involute toothing on a cylindrical gear drive.

According to an advantageous feature of the present invention, the computer may autonomously determine the data, which are characteristic of the contact paths relating to each particular radius from the plurality of radii centered at the axis intersection point, by reference to macroscopic target characteristics of the bevel gear drive. In particular, it is possible that the computer, for the purpose of determining the data, which are characteristic of the contact paths relating to each particular radius from the plurality of radii centered at the axis intersection point, determines the contact paths in such a way that frictional forces or interrolling noises, which arise when the bevel gears rotate, are minimal.

According to another aspect of the invention, a bevel gear drive includes a first bevel gear having a plurality of first teeth and in operation rotating about a first axis of rotation at a first rotation speed, and a second bevel gear having a plurality of second teeth and in operation rotating about a second axis of rotation at a second rotation speed, with the first axis of rotation intersecting the second axis of rotation at an axis intersection point and forming an angle of intersection, with first tooth flanks on the first teeth and second tooth flanks on the second teeth operating on each other along a contact path associated with a particular radius of a plurality of radii centered at the axis intersection point. The contact path associated with the particular radius includes a sequence of contact points at which one of the first tooth flanks operates on a corresponding second tooth flank during rotation of the first and the second bevel gears. For radii associated with corresponding contact paths, the tooth shape of the first tooth flanks is matched to the tooth shape of the second tooth flanks such that each of the first and second tooth flanks operating on each other have a common normal for that radius at all contact points, with the common normal passing through a pitch point associated with the particular radius. The pitch point is hereby located between the first and second axes of rotation at a distance from the axis intersection point equal to the particular radius and forms with the first axis of rotation a pitch angle according to the relationship $$\tan\gamma = \frac{\sin\delta}{\omega_1/\omega_2 + \cos\delta},$$

wherein $\gamma$ is the pitch angle, $\delta$ is an angle of intersection between the first rotation axis and the second rotation axis, $\omega 1$ the first rotation speed and $\omega 2$ the second rotation speed.

The advantageous embodiments for determining the geometry data according to the present invention apply likewise also to the bevel gear drive according to the present invention.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 1:
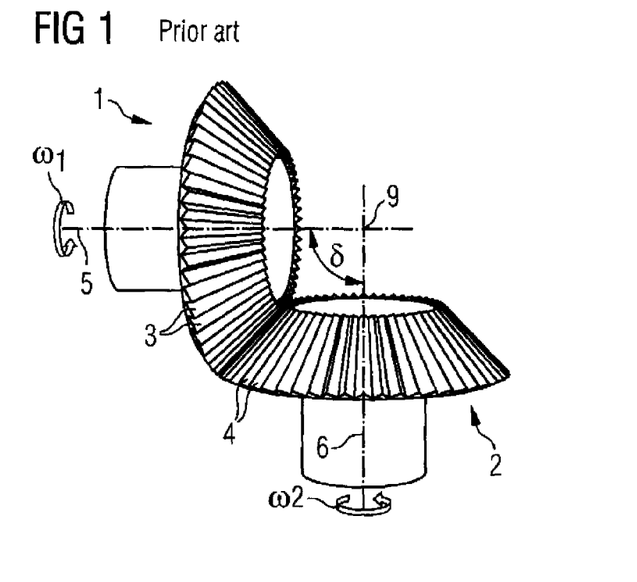
FIG. 1 shows a schematic diagram of a bevel gear drive with two bevel gears according to the present invention.

Turning now to the drawing, and in particular to FIG. 1, there is shown a bevel gear drive with two bevel gears 1, 2. Each of the bevel gears 1, 2 has a number of teeth 3, 4. The numbers of teeth 3, 4 can be the same. In general they are different from each other.

In operation, the bevel gears 1, 2 rotate, each with a rotational speed $\omega_1$, $\omega_2$ about its particular axis of rotation 5, 6. The bevel gears 1, 2 intermesh with each other during the rotation. They thus act on each other via tooth flanks 7, 8 (see FIGS. 2 and 3) on their teeth 3, 4. The rotational speeds $\omega_1$, $\omega_2$ are thus linked to each other via the numbers of teeth 3, 4.

The axes of rotation 5, 6 are not parallel to one another. However, they do lie in a common plane and intersect each other at an axis intersection point 9. At the axis intersection point 9 they form an angle of intersection $\delta$. The angle of intersection $\delta$ is often 90°. However, it can equally well be greater than 90° or less than 90°.

In various respects the bevel gears 1, 2 are equivalent. So, for example, it is unimportant which of the two bevel gears 1, 2 drives the other bevel gear 2, 1. It is equally irrelevant whether one of the bevel gears 1, 2 has a larger number of teeth, and if so which one. In order to be able to distinguish between the bevel gears 1, 2 they will however, insofar as is necessary, be referred to below as the first bevel gear 1 and the second bevel gear 2. The same also applies for terms relating to the bevel gears 1, 2 such as for example, their teeth 3, 4, their axes of rotation 5, 6 and their rotation speeds $\omega_1$, $\omega_2$.

Figure 2:
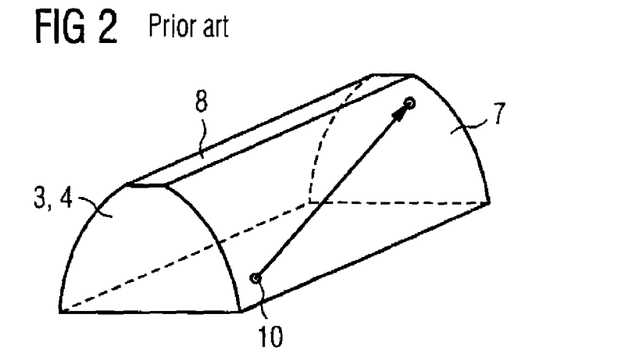
FIG. 2 shows a perspective diagram of a tooth of a bevel gear.

FIG. 2 shows a single tooth 3, 4 on one of the bevel gears 1, 2. This could be either a first tooth 3 on the first bevel gear 1 or a second tooth 4 on the second bevel gear 2. Each tooth 3, 4 has a tooth flank 7, 8, with which the particular tooth 3, 4 acts on the tooth flank 8, 7 on a tooth 4, 3 of the other bevel gear concerned, 2, 1. There is only a point contact between each of the tooth flanks 7, 8 which are acting on each other. During the rotation of the bevel gear concerned 1, 2, the point 10—referred to below as the action point 10 and shown in the drawing in FIG. 2 as a small circle—moves over the tooth flank 7, 8. This is indicated in FIG. 2 by a corresponding arrow. This type of contact is realized with bevel gears 1, 2 of the prior art.

Figure 3:
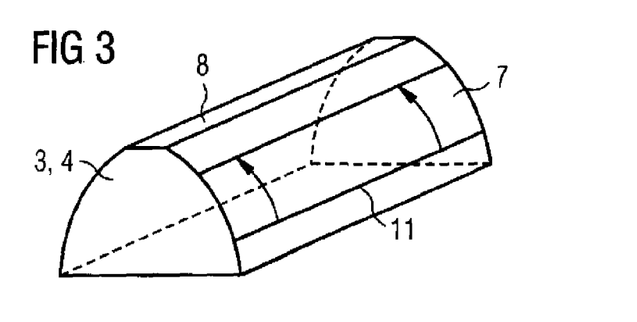
FIG. 3 shows another perspective diagram of a tooth of a bevel gear.

FIG. 3 also shows an individual tooth 3, 4. Analogous to FIG. 2, this can be a first tooth 3 on the first bevel gear 1 or alternatively a second tooth 4 on the second bevel gear 2. Each tooth 3, 4 has a tooth flank 7, 8, with which the tooth concerned 3, 4 acts on the tooth flank 8, 7 of a tooth 4, 3 of the other bevel gear concerned, 2, 1. However, unlike FIG. 2, with the tooth shape as shown in FIG. 3 the contact between tooth flanks 7, 8 which act on each other is along a line 11—in what follows this is called the contact line 11. The contact line 11 moves during the rotation of the bevel gear concerned 1, 2, in an analogous way to the action point 10 in FIG. 2 on the appropriate tooth flank 7, 8. This is indicated in FIG. 3 by corresponding arrows. However, as it moves the contact line 11 continues to be a line.

For cylindrical gear drives (i.e. drives for which the gears are essentially cylindrical in form and the teeth are arranged on the outer surfaces of the cylinder), tooth forms by means of which a linear contact of this type can be achieved have long been known. Purely by way of example, the so-called involute toothing can be cited. In the case of bevel gear drives, tooth shapes of this type are indeed known theoretically in the prior art, but in practice they are not manufactured and used.

The subject matter of the present invention is a method of determination, which is simple to realize and to implement, for the geometry data of at least one of the bevel gears 1, 2 of the bevel gear drive, such that a linear contact is also realized for the bevel gear drive. The subject matter of the present invention is, furthermore, a corresponding bevel gear drive.

For the purpose of determining the geometry data for one of the bevel gears 1, 2, it is of course necessary to know basic data, such as for example the position of the axes of rotation 5, 6, the desired transmission ratio and other macroscopic geometry parameters, such as for example the maximum diameter of the bevel gears 1, 2 and their depth looking upward in the direction of the axis of rotation concerned 5, 6. The determination and optimization of this data is not the subject matter of the present invention. Nor is the subject matter of the present invention the question as to whether the bevel gear drive should preferably have coarse toothing with a few relatively large teeth 3, 4 or rather a fine toothing with a larger number of smaller teeth 3, 4. The subject matter of the present invention is how a shape which affects the desired linear contact can be determined in a simple and elegant way for the tooth flanks 7, 8 of the teeth 3, 4 which act on each other.

In the context of the method, it is furthermore possible that the geometry data for the second bevel gear 2—in particular the shaping of its tooth flanks 8—is already given. In this case, solely the geometry data of the first bevel gear 1 will be determined. Alternatively, it is possible that the geometry data for the second bevel gear 2 is not yet given. In this case the geometry data for the second bevel gear 2 can also be determined—analogously to the geometry data for the first bevel gear 1—as part of the method in addition to the geometry data for the first bevel gear 1. This will become apparent from the further embodiments.

Figure 4:
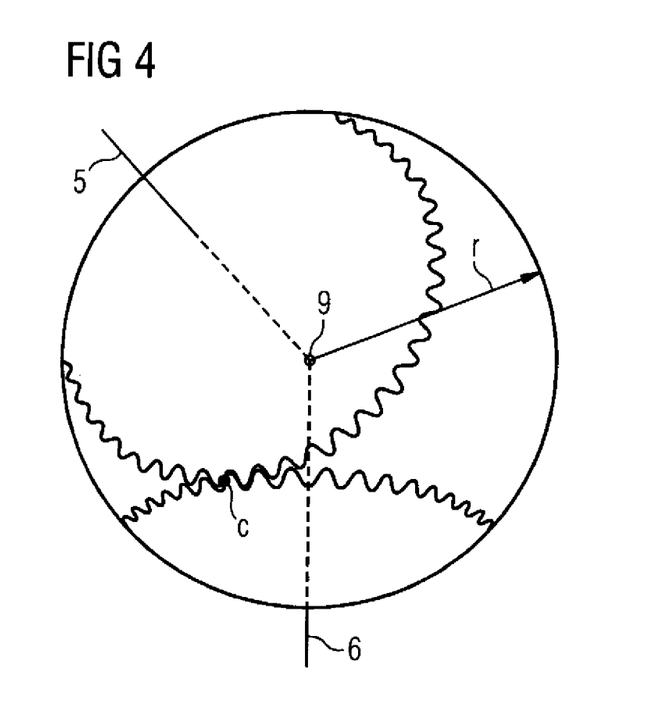
FIG. 4 shows schematically a spherical section.

In order to explain the approach of the present invention in more detail, we start by considering a spherical section as shown in FIG. 4 with a radius r—in principle arbitrary—about the axis intersection point 9. The spherical section includes a part of the first bevel gear 1, namely that part of the first bevel gear 1 which is at a distance r from the axis intersection point 9. In an analogous way, the spherical section also includes a part of the second bevel gear 2.

Figure 5:
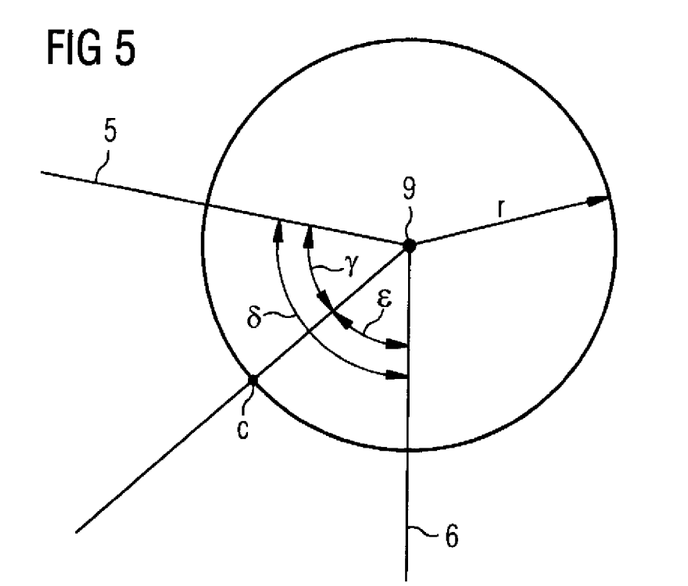
FIG. 5 shows schematically the spherical section of FIG. 4 with the angles used in the equations.

Further, for the spherical section considered, a pitch point c is determined. As shown in FIGS. 4 and 5, the pitch point also lies on the spherical section under consideration. It is thus at a distance r from the axis intersection point 9. Furthermore, the pitch point c lies between the two axes of rotation 5, 6, that is in particular within the plane defined by the two axes of rotation 5, 6. The pitch point c divides the angle of intersection δ in such a way that the pitch point c—obviously with the axis intersection point 9 as the common vertex—forms a pitch angle γ with the first axis of rotation. The pitch angle γ satisfies the relationship $$\tan\gamma = \frac{\sin\delta}{\omega_1/\omega_2 + \cos\delta}. \tag{1}$$

In an analogous way, the pitch point c forms a complementary angle ε with the second axis of rotation 6, as given by the relationship $$\tan\varepsilon = \frac{\sin\delta}{\omega_2/\omega_1 + \cos\delta}. \tag{2}$$

Obviously, the pitch angle γ and the complementary angle ε add up to the angle of intersection δ.

Figure 6:
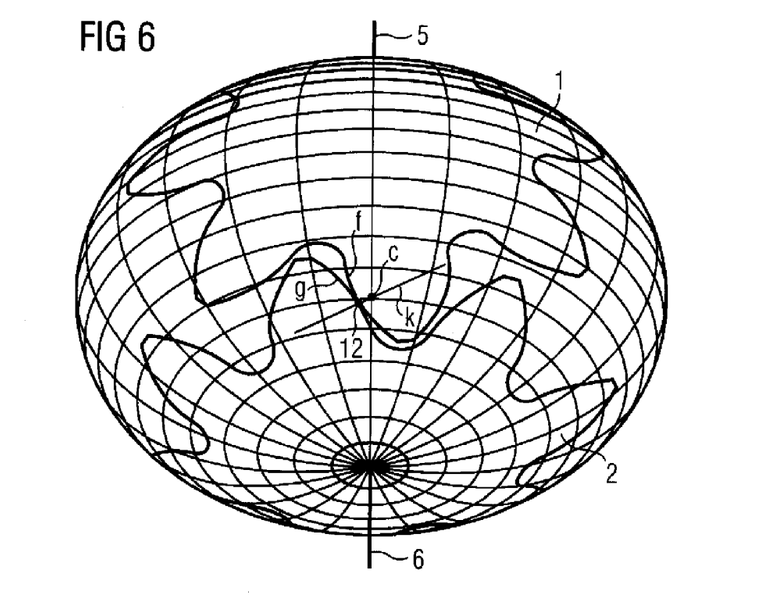
FIG. 6 shows a contact path along the spherical section.
Figure 7:
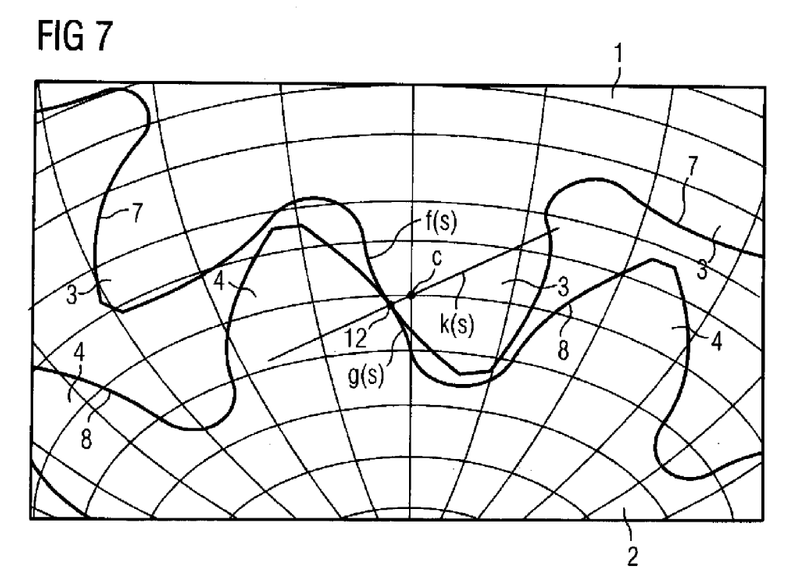
FIG. 7 shows a detail of FIG. 6 on an enlarged scale.

It is further assumed that a contact path k is given. The contact path k is also relative to the radius r, that is it runs over the spherical section defined by the radius r. FIG. 6 shows, purely by way of example, a contact path k of this type. FIG. 7 is an enlarged view of a detail from FIG. 6.

The contact path k corresponds to a sequence of points at which the two parts of the bevel gears 1, 2 which are selected by the spherical section are intended to touch (come into contact) from time to time during the rotation of the bevel gears 1, 2. It thus corresponds to the section of the spherical surface along which one of the first tooth flanks 7 is to act on one of the second tooth flanks 8. These points will be referred to below as contact points. One of the contact points has been given the reference mark 12 in FIGS. 6 and 7. As can be seen from FIGS. 6 and 7, the contact path k contains in particular the pitch point c.

With the exception of the singular case that the contact point 12 is identical to the pitch point c, the contact point 12 and the pitch point c define a straight line. Hence a plane which contains the contact point 12 concerned and is orthogonal to the straight line mentioned is also clearly defined. Starting from the contact point 12, the spherical section thus has on it a defined line which runs orthogonally to the straight line. This line corresponds to the course—relative to the spherical section, i.e. the radius r, under consideration—which contour lines f, g of the first and second tooth flanks 7, 8 must have, at the contact point 12 which is at that instant under consideration, in order to effect a uniform force transmission, at the contact point 12 under consideration, from the first to the second bevel gear 1, 2 (or vice versa) within the spherical section under consideration. If the stated condition is satisfied for each contact point 12 along the contact path k, the spherical section under consideration satisfies a toothing rule which will be referred to below as a spherical toothing rule.

From a mathematical point of view, the facts of the matter can be described as follows: the contact path k for a particular radius r can—without loss of generality—be written in spherical coordinates (i.e. the radius r and two angular coordinates θ, φ) as follows:

$$k(s,r) = r \cdot \begin{pmatrix} \sin\vartheta_k(s,r)\cos\varphi_k(s,r) \\ \sin\vartheta_k(s,r)\sin\varphi_k(s,r) \\ \cos\vartheta_k(s,r) \end{pmatrix} \quad (3)$$

The coordinates r, θ, φ are relative to a coordinate system whose origin is at the axis intersection point 9. s is a path parameter which, together with the radius r, determines on a one-to-one basis (uniquely) the associated angular coordinates θ, φ and thus the contact point 12 under consideration. The angular coordinates θ, φ are thus functions of the radius r and of the path parameter s. The index for the angular coordinates θ, φ establishes the reference to the contact path k.

In an analogous way it is possible—in relation to an individual tooth flank 7 of a tooth 3 on the first bevel gear 1 and in relation to the spherical section already repeatedly mentioned—to write the contour of the appropriate tooth flank 7 (i.e. the contour line f) when the first bevel gear 1 is stationary as a function of the same path parameter s and of the radius r. Here again, the angular coordinates θ, φ are functions of the radius r and of the path parameter s. In particular it is the case that $$f(s,r) = r \cdot \begin{pmatrix} \sin\vartheta_f(s,r)\cos\varphi_f(s,r) \\ \sin\vartheta_f(s,r)\sin\varphi_f(s,r) \\ \cos\vartheta_f(s,r) \end{pmatrix} \quad (4)$$

The index for the angular coordinates θ, φ again establishes the reference, in this case to the contact line f.

If the first bevel gear 1 rotates, and with it the contour line f, with the first rotational speed of $\omega_1$ about the first axis of rotation 5, the time-dependent position of the contour line f becomes $$f(s,r,t) = ROT(t) \cdot f(s,r). \quad (5)$$

ROT(t) represents the time-dependent rotation matrix which describes the turning of the contour line f under consideration. It can be written as $$ROT(t) = \begin{pmatrix} \cos\omega_1 t & \sin\omega_1 t & 0 \\ -\sin\omega_1 t & \cos\omega_1 t & 0 \\ 0 & 0 & 1 \end{pmatrix} \quad (6)$$

In this connection it has been assumed for the rotation matrix ROT(t), without loss of generality, that the first bevel gear 1 rotates about the z-axis of the coordinate system centered at the axis intersection point 9.

For the purpose of determining the contour line f, two conditions are available. On the one hand, at the point in time t at which the (rotating) first tooth flank 7 reaches a particular contact point 12 on the contact path k the following condition applies for this contact point 12

$$f(s,r,t) = k(s,r). \quad (7)$$

In other words: at the contact time point t under consideration, even if this is unknown, the corresponding point on the appropriate contour line f is located at the contact point 12 identified.

Furthermore, at the site of the contact point 12 under consideration the contour line f of the first tooth flank 7 should run orthogonally to the connecting line between the contact point 12 under consideration and the pitch point c. Hence—in vector notation—the condition $$\frac{\partial f(s,r,t)}{\partial s} \circ (k(s,r) - c(r)) = 0 \quad (8)$$

must also be satisfied. That is, the scalar product of the derivative of the contour line f with respect to the path parameter s and the directional vector from the contact point 12 under consideration to the pitch point c must be 0.

These conditions can be converted into a contact time function t(s,r), which assigns to each contact point 12 a clearly defined contact time point at which the contact point 12 under consideration is reached. In particular, for a given contact path k(s,r) the contact time function t(s,r) becomes $$t(s,r) = \int_{s_0}^{s} \frac{\frac{\partial k(\sigma,r)}{\partial \sigma} \circ [k(\sigma,r) - c(r)]}{\omega_1[c_y(r)k_x(\sigma,r) - c_x(r)k_y(\sigma,r)]} d\sigma + t_0(r). \quad (9)$$

$s_0$ corresponds to a first contact point 12 on the contact path k under consideration, which is first reached by the first tooth flank 7 under consideration. $t_0$ is an integration constant. In principle this can be freely chosen, if only one individual spherical section is under consideration (i.e. radius r=const.).

On the basis of the above relationships, there is in the co-rotating coordinate system of the first bevel gear 1 the following equation, which ensures that along the contact path k under consideration for each contact point 12 on the contact path k under consideration the contour line f is, at the place where it instantaneously crosses the contact path k, orthogonal to the connecting line between the contact point 12 and the pitch point c:

$$f(s,r) = ROT^{-1}(t(s,r)) \cdot k(s,r). \quad (10)$$

$ROT^{-1}$ is here the inverse rotation matrix at the contact time point t(s,r). Written out in full, the inverse rotation matrix $ROT^{-1}$ becomes $$ROT^{-1}(t(s,r)) = \begin{pmatrix} \cos\omega_1 t(s,r) & -\sin\omega_1 t(s,r) & 0 \\ \sin\omega_1 t(s,r) & \cos\omega_1 t(s,r) & 0 \\ 0 & 0 & 1 \end{pmatrix} \quad (11)$$

When the relevant contact path k(s,r) is defined for a plurality of radii r, then the totality of the contour lines f(s,r) for the first tooth flank 7 under consideration is also clearly determined. It is given in the co-rotating coordinate system of the first bevel gear 1 by the above equations 10 and 11.

In an analogous way, the contour line g(s,r) can be determined for the second tooth flanks 8 on the second teeth 4 of the second bevel gear 2.

When working together, a pair of tooth flanks 7, 8 which act on each other and which satisfy the above equations guarantee permanent linear contact during their interrolling.

The relevant integration constant $t_0(r)$ for each spherical section is contained implicitly in the contact time function $t(s,r)$. The integration constant $t_0(r)$ can be the same for all radii r. In this case, the bevel gears 1, 2 are linearly toothed. If the integration constant $t_0(r)$ is a linear function of the radius r, the bevel gears 1, 2 are obliquely toothed. If the integration constant $t_0(r)$ is a curve, the bevel gears have curved teeth.

From the above embodiments it can be seen that, in the case that the contact path k relating to each particular radius r is known for a plurality of radii r, it is possible from the contact path to determine clearly—for the spherical section considered—the tooth shape of the first and the second tooth flanks 7, 8. As can be seen without further explanation, the approach in which the starting point is the contact path k and from this the contour line f of the first tooth flank 7 is determined can be inverted without further ado. Hence if, in reverse, the tooth shape of the first tooth flank 7 is given, it is possible from this to determine the contact path k for each appropriate radius r. From the contact paths k it is then possible in turn to determine clearly the tooth shape for the second tooth flank 8 of the teeth 4 on the second bevel gear 2. Analogous embodiments apply of course if the starting point is the contour lines g(s,r) of the second tooth flanks 8. It is thus sufficient if, for each of a plurality of radii r, one of the three curves

- contour line f of the first tooth flank 7,
- contour line g of the second tooth flank 8 and
- contact path k of the two tooth flanks 7, 8 is known. The two other curves can be clearly determined from the one known curve. The only remaining degree of freedom is the question as to whether the bevel gears 1, 2 should have linear, oblique or curved teeth. This degree of freedom can be fixed by prescribing a functional relationship for the integration constant $t_0(r)$ as a function of the radius r under consideration.

From the above embodiments it can be further seen that the solution determined for a particular radius r can without further ado be transferred 1:1 to other radii. It is thus possible, in particular, that for two arbitrary radii r, for each of which a contact path k is defined, one of the two contact paths k is mapped onto the other contact path k by scaling centered at the axis intersection point 9. However, this is not absolutely necessary.

On the one hand it is possible that the contact paths—scaled to a uniform radius—do not extend equally far away from the (correspondingly scaled) pitch point. In particular, it is possible that those contact paths k which are scaled from the minimum and/or the maximum radii r to the uniform radius are, in the scaled state, shorter than the contact paths k which are scaled from intermediate radii r to the uniform radius. In this case, only one contact path (namely the shorter contact path) will be mapped onto a section of the other (longer) contact path k.

On the other hand, it is not absolutely necessary to prescribe the contact path k in relation to the angular coordinates $\theta$, $\phi$ in the same way for all radii r. In particular, it is possible to prescribe a first contact path k in relation to the angular coordinates $\theta$, $\phi$ for a first radius r, for example, and a second contact path k for a second radius r. In this case it is possible, for example, for the contact paths k to make a gradual transition, for radii r lying between the first and the second radius r, from the first to the second contact path k in terms of the angular coordinates $\theta$, $\phi$. In this connection, the term "gradual" means a steady transition as a function of the radius r. Preferably, the transition will be differentiable, in particular continuously differentiable.

In the case where there is a unified prescription for all the radii r the contact paths k can, for example, as shown in FIGS. 6 and 7, lie on a great circle, containing the relevant pitch point c, about the axis intersection point 9. In this case, the contact path concerned k(s,r) can be represented as $$k(s, r) = r \begin{pmatrix} \cos\alpha\cos s \\ -\sin\gamma\sin s + \cos\gamma\sin\alpha\cos s \\ \cos\gamma\sin s + \sin\gamma\sin\alpha\cos s \end{pmatrix}. \quad (12)$$

In equation 12, $\alpha$ is a parameter which—within limits—can be freely chosen. It defines the inclination of the great circle.

With a great circle, the contact time function t(s,r) becomes a linear function. In particular, the above representation becomes $$t(s, r) = \frac{s_0 - s}{\omega_1 \sin\gamma\sin\alpha} + t_0. \quad (13)$$

Under the—permissible—assumption that the integration constant $t_0$ has the value 0, the first contour line f(s,r) is then obtained by simply inserting t(s,r) into the inverse rotation matrix $ROT^{-1}$ and performing the matrix multiplication.

After these basic embodiments on the mathematical-physical fundamentals of the present invention, the inventive method for the determination of the geometry data for the first bevel gear 1 will now be explained in more detail. Here, only the features relevant to the invention will be discussed further.

Figure 8:
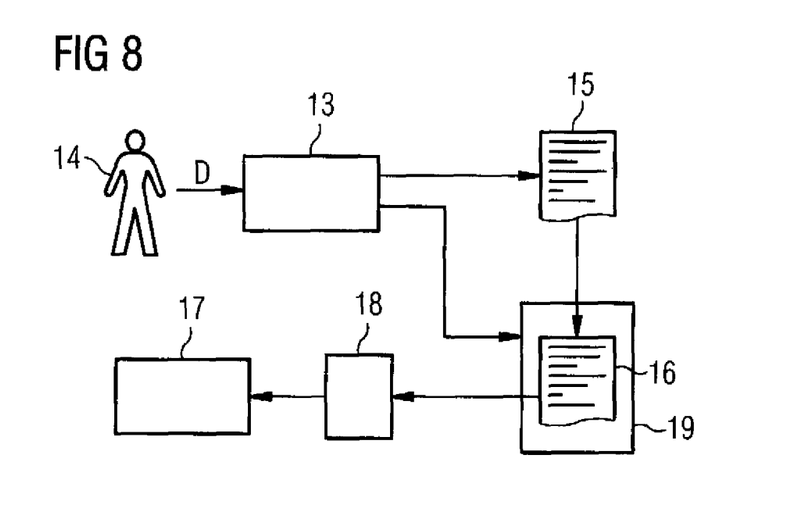
FIG. 8 shows in form of a schematic block diagram a system for producing a bevel gear drive according to the present invention.
Figure 9:
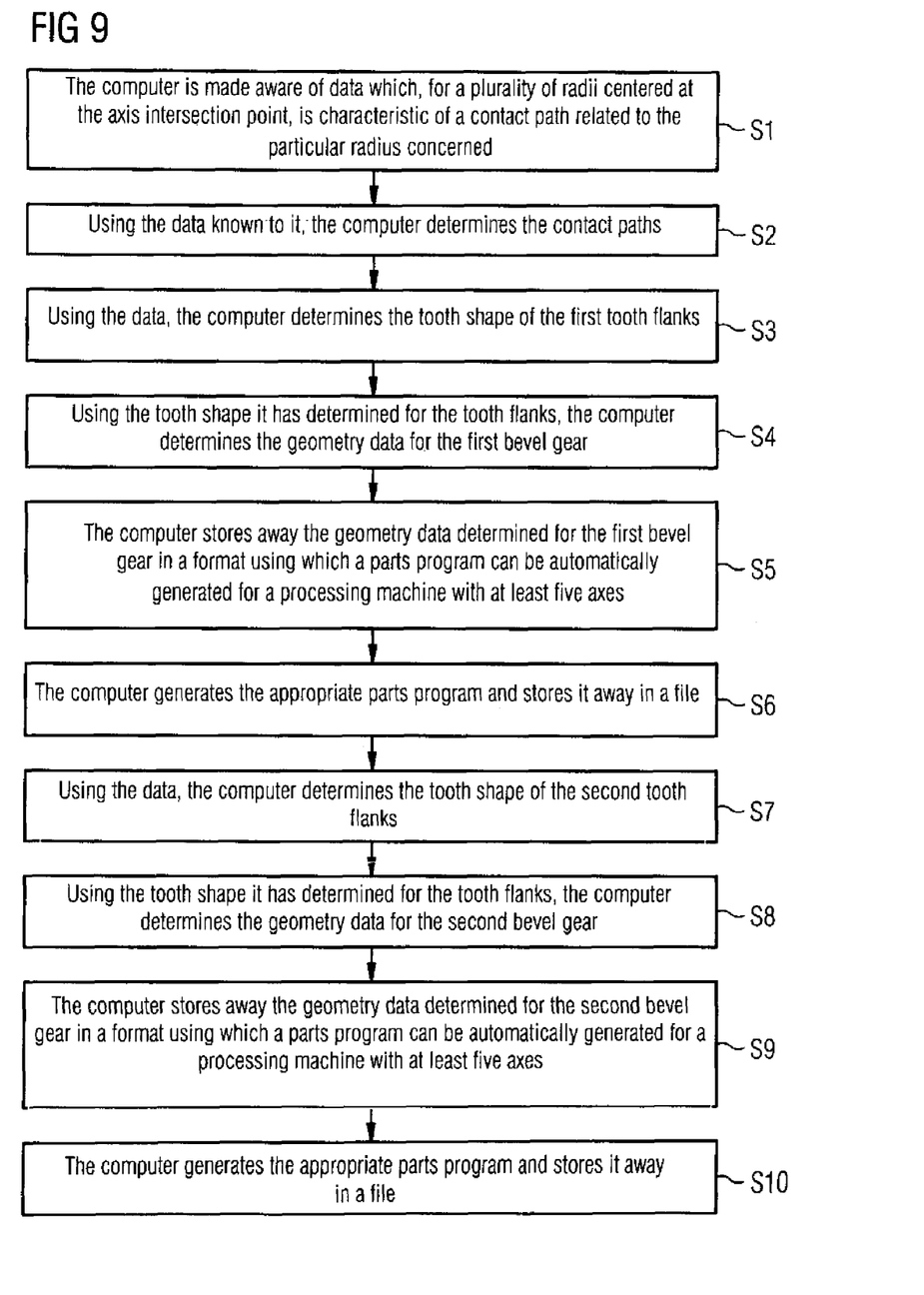
FIG. 9 shows a process flow diagram for generating a parts program for producing the two bevel gears according to the present invention.

As shown in FIGS. 8 and 9, a computer 13 is made aware of data D in the step S1. For each of a plurality of radii r, the data D are characteristic of a contact path k relating to each particular radius r. The radii r are centered at the axis intersection point 9.

It is possible that the computer 13 determines the data D autonomously. This will be discussed in more detail later. Alternatively, it is possible that the data D is prescribed for the computer 13 from outside, be this as manual inputs by a user 14, or be it for example by measurement of the second bevel gear 2. Mixed forms are also possible.

As already set out in connection with the mathematical-physical fundamentals, the data D can be identical with the contact paths k themselves. Alternatively, the data D can be the tooth shape of the second tooth flanks 8. In this last case, there may be an additional step S2, in which the computer 13 explicitly determines the contact paths k by reference to the data D which is known to it.

Alternatively, other data may be involved insofar as the data D is not the tooth shape of the first tooth flanks 7. This is because it is precisely these data—that is the tooth shape of the first tooth flanks 7—which are to be determined by the computer 13. Even in this case, where the data D is indeed characteristic of the contact path k but is not identical with the contact paths k nor with the tooth form of the second tooth flanks 8, step S2—appropriately adapted—can be present.

In a step S3, the computer 13 determines by reference to the data D—that is explicitly or implicitly by reference to the given contact paths k—the tooth shape of the first tooth flanks 7. In particular, in step S3 the computer 13 determines, for those radii r for which the relevant contact path is defined, the appropriate contour lines f of the first tooth flanks 7 in such a way that the spherical toothing rule, which has been derived and explained in full above, is satisfied.

In a step S4, the computer 13 makes use of the tooth shape for the tooth flanks 7 of the teeth 3 on the first bevel gear 1, determined in step S3, to determine the geometry data for the first bevel gear 1. The inputs to the determination of step S3 include (among other items) the other macroscopic geometry parameters of the first bevel gear 1. In particular, the computer 13 will as a general rule determine the tooth shape of the tooth flanks 7 of the first teeth 3 only a single time, but will however use it several times, namely corresponding to the number of first teeth 3 on the first bevel gear 1.

In a step S5, the computer 13 stores away the geometry data which it has determined for the first bevel gear 1. It stores the geometry data in a file 15, in a format using which a parts program 16 can be generated automatically for a processing machine 17. Before step S5 is performed the computer 13 can, for example, re-sort the geometry data which has been determined. In particular, the computer 13 can re-sort the geometry data items in such a way that they are no longer sorted with respect to the radii r centered at the axis intersection point 9, but into lines which—centered at the axis intersection point 9—run essentially radially, that is in a direction toward the axis intersection point 9 or away from it. Because the processing by the processing machine 17 is often carried out along lines of this type.

It is further possible that the computer 13 stores away the geometry data in such a way that, in the processing of the bevel gear blank for the first bevel gear 1, a processing tool in the processing machine 17—for example a milling or grinding head—moves, along the lines mentioned above, only toward the axis intersection point 9 (or only away from it). The other direction of movement in each case will then be used only for retracting the processing tool.

The processing machine 17 will have at least five axes, namely at least 3 linear axes and at least two axes of rotation (or equivalent positioning controls for the degrees of freedom mentioned). In this context, spindle axes which are used mainly for rotation, i.e. are operated with rotation speed regulation but not position regulation, are not considered as axes of the processing machine 17.

The execution of the parts program 16 by a numerical controller 18 on the processing machine 17 effects a point by point processing of the bevel gear blank for the first bevel gear 1. For example, milling or grinding may be performed. The precision of the processing can be determined as required. It can if necessary be determined directly by the geometry data of the first bevel gear 1. The overall result effected by the execution of the parts program 16 is the manufacture of the first bevel gear 1.

Alternatively or additionally to step S5 there may be a step S6. If the step S6 is present, the computer 13 itself generates the appropriate parts program 16 and stores it away in a file 19.

If the data D, which are made known to the computer 13 in step S1, are data other than the tooth shape of the second tooth flanks 8 on the teeth 4 of the second bevel gear 2, there may be—in addition to steps S3 to S6—further steps S7 to S10 present. In this case the content of steps S7 to S10 corresponds to the steps S3 to S6, but relate to the second bevel gear 2. If steps S7 to S10 are present in step S7 the computer 13 determines, by reference to the data items D known to it, the tooth shape of the second tooth flanks 8, using the tooth shapes determined in step S7, the computer 13 determines the geometry parameters of the second bevel gear 2, in step S9 the computer 13 stores away the geometry data for the second bevel gear 2 in the appropriate format, so that a parts program can be automatically generated, and in step S10 the computer 13 itself generates the parts program and stores this away in a file.

As already mentioned, it is possible that the contact paths k have been or are prescribed—directly or indirectly—to the computer 13. Alternatively, it is possible that the computer 13 autonomously determines the characteristic data D for them. This is explained in more detail below in conjunction with FIG. 10.

Figure 10:
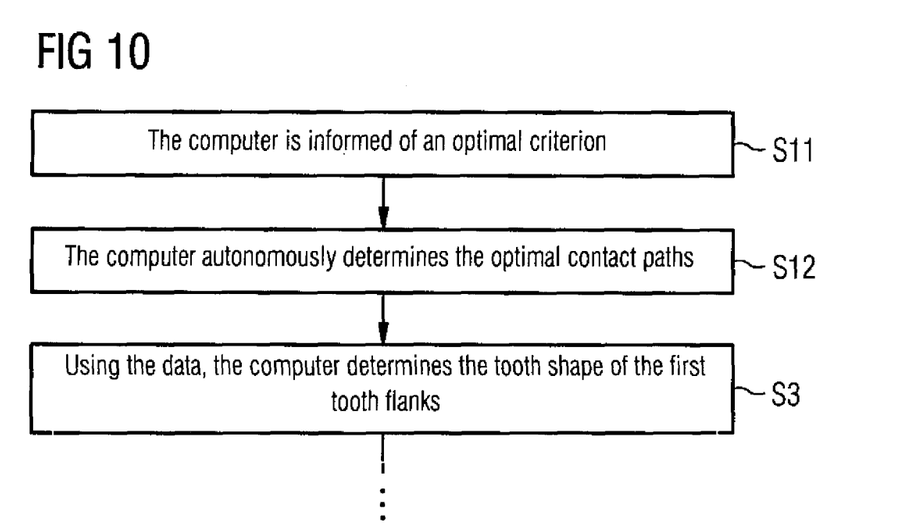
FIG. 10 shows a process flow diagram for generating an alternative parts program for producing the two bevel gears according to the present invention.

In FIG. 10, the steps S1 and S2 in FIG. 9 are replaced by steps S11 and S12. In step S11, the computer 13 is informed of optimal criterion. For example, the user 14 can prescribe to the computer 13 that it is to determine the contact paths k in such a way that frictional forces or interrolling noises which arise as the bevel gears 1, 2 rotate are minimized. Other optimal criteria are also possible. In step S12, the computer 13 autonomously determines the optimal contact paths k.

Thereafter follow steps S3 to S6 and, if applicable, also S7 to S10. The steps S3 to S10 are not explained again below, because these steps have already been explained in conjunction with FIG. 9.

When the parts program 16 is executed by the processing machine 17 with at least five axes, the first bevel gear 1 is produced by the processing machine 17. Because the parts program 16 was appropriately determined, the production corresponds to the properties which formed the basis for the determination of the parts program 16. In particular, the first tooth flanks 7 of the first teeth 3 and the second tooth flanks 8 of the second teeth 4 of the corresponding bevel gear drive act on each other along each contact path k(s,r) for a plurality of radii r (each of these being centered at the axis intersection point 9). The tooth shapes of the first and second tooth flanks 7, 8 are, for these radii r, matched to each other in such a way that for all the radii r along the particular contact path k there is in each case a contact between the first tooth flanks 7 and the second tooth flanks 8. In particular, the tooth shapes of the first and second tooth flanks 7, 8 are matched to each other for these radii r in such a way that at all the contact points 12 on the contact paths k each of the first and second tooth flanks 7, 8 which act on each other have, relative to the radius r concerned, a common normal which passes through the pitch point c relating to the radius r concerned. This results in the linear contact sought, relative to the tooth flanks 7, 8. The (real) contact paths k correspond—of course—to those contact paths k which were laid down as the basis for the calculation of the tooth flanks 7, 8.

The present invention has been outlined above in conjunction with bevel gears 1, 2 the teeth 3, 4 of which each have one tooth flank 7, 8 which interacts in each case with the tooth flanks 8, 7 on the teeth 4, 3 of the other bevel gear 2, 1. However, for many applications both tooth flanks 7, 8 of the teeth 3, 4 work together with each other, that is for example in terms of a particular first tooth 3 both its front and its rear tooth flank 7. An example of an application of this type is a drive which works together with an electric machine which can be operated alternatively as a motor or as a generator. Another example is a bevel gear drive which works together with an internal combustion engine which is sometimes also used as a motor brake (for example when a motor vehicle is traveling downhill). Other embodiments are also conceivable. For example, in the case of an electric drive, there might be a reversal of the rotation sense.

If the teeth 3, 4 of the bevel gears 1, 2 each have two tooth flanks 7, 8 which interact in each case with the tooth flanks 8, 7 of the teeth 4, 3 of the other bevel gear 2, 1, the methods as explained above are of course also applicable. They need only be applied for both tooth flanks 7 of the first tooth 3 concerned and, if appropriate, also for both tooth flanks 8 of each second tooth 4.

If, as part of the production of the first bevel gear 1 (that is, as part of the execution of the parts program 16) both tooth flanks 7 of the teeth 3 on the first bevel gear 1 are to be processed it is, in particular, possible to process the front tooth flanks 7 while the processing tool of the processing machine 17 is moved along the relevant line toward the axis intersection point 9, and to then process the rear tooth flank 7 when the processing tool of the processing machine 17 is being moved along the relevant line away from the axis intersection point 9. This approach can have advantages in terms of manufacturing engineering.

The present invention has many advantages. In particular, due to the linear contact there is a more uniform force transmission, and a lower stress on the materials of the bevel gear drive. Furthermore, the inventive method permits the optimization of the bevel gear drive in respect of desired macroscopic parameters, such as for example noise generation or frictional losses.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method for determining, in a bevel gear drive having a first bevel gear with a plurality of first teeth and a second bevel gear with a plurality of second teeth, with a computer geometry data of the first bevel gear, said first bevel gear in operation rotating about a first axis of rotation at a first rotation speed and said second bevel gear in operation rotating about a second axis of rotation at a second rotation speed, the method comprising the steps of:

determining a tooth shape for first tooth flanks on the first teeth, which interact with second tooth flanks on the second teeth, based on data other than the tooth shape for first tooth flanks, wherein the data are associated with a plurality of contact paths computed for a corresponding plurality of radii centered at an axis intersection point, with a contact path associated with a corresponding radius being represented by a sequence of contact points at which during rotation of the first and second bevel gears a first tooth flank operates on a corresponding second tooth flank, determining for those radii that have an associated contact path, the tooth shape for the first tooth flanks associated with each of the radii, such that each of the first and second tooth flanks operating on each other have a common normal for that radius at all contact points relating to the particular radius, with the common normal passing through a pitch point associated with the particular radius, wherein the pitch point is located between the first and second axes of rotation at a distance from the axis intersection point equal to the particular radius and forms with the first axis of rotation a pitch angle according to the relationship $$\tan\gamma = \frac{\sin\delta}{\omega_1/\omega_2 + \cos\delta},$$

wherein $\gamma$ is the pitch angle, $\delta$ is an angle of intersection between the first rotation axis and the second rotation axis, $\omega 1$ the first rotation speed and $\omega 2$ the second rotation speed, determining the geometry data for the first bevel gear based on the tooth shape determined for the first tooth flanks and a contact time function for the contact path defined by $$t(s, r) = \int_{s_0}^{s} \frac{\frac{\partial k(\sigma, r)}{\partial \sigma} \circ [k(\sigma, r) - c(r)]}{\omega_1 [c_y(r)k_x(\sigma, r) - c_x(r)k_y(\sigma, r)]} d\sigma + t_0(r),$$

wherein $k(\sigma, r)$ is the contact path, s is a path parameter, r is a radius at a contact point, $s_0$ is a first contact point along the contact path, c is the pitch point, and $t_0$ is a radius-dependent integration constant that depends on the tooth shape for first tooth flanks on the first teeth, and storing the geometry data in a format which allows automatic generation of a parts program for a processing machine with at least five axes, for manufacturing the first bevel gear.

2. The method of claim 1, wherein the parts program is directly generated from the geometry data.

3. The method of claim 1, further comprising the steps of:
defining a corresponding contact path for each of two arbitrary radii, and mapping one of the two contact paths by centric scaling in relation to the axis intersection point onto the other contact path or onto a section of the other contact path containing the pitch point of the other contact path.

4. The method of claim 1, wherein the data comprise the contact paths or the tooth shape of the second tooth flanks.

5. The method of claim 1, wherein the contact paths are located on a great circle around the axis intersection point, with the great circle including the pitch point.

6. The method of claim 1, wherein the data are automatically determined based on desired macroscopic properties of the bevel gear drive.

7. The method of claim 6, wherein the data are determined from contact paths that minimize frictional forces or inter-rolling noises produced during rotation of the bevel gears.

8. A bevel gear drive comprising:
a first bevel gear having a plurality of first teeth and in operation rotating about a first axis of rotation at a first rotation speed,
a second bevel gear having a plurality of second teeth and in operation rotating about a second axis of rotation at a second rotation speed, with the first axis of rotation intersecting the second axis of rotation at an axis intersection point and forming an angle of intersection, with first tooth flanks on the first teeth and second tooth flanks on the second teeth operating on each other along a contact path associated with a particular radius of a plurality of radii centered at the axis intersection point, wherein the contact path associated with the particular radius comprises a sequence of contact points at which one of the first tooth flanks operates on a corresponding second tooth flank during rotation of the first and the second bevel gears, wherein for radii associated with corresponding contact paths, the tooth shape of the first tooth flanks is matched to the tooth shape of the second tooth flanks such that each of the first and second tooth flanks operating on each other have a common normal for that radius at all contact points, with the common normal passing through a pitch point associated with the particular radius, with the pitch point being located between the first and second axes of rotation at a distance from the axis intersection point equal to the particular radius and forming with the first axis of rotation a pitch angle according to the relationship $$\tan\gamma = \frac{\sin\delta}{\omega_1/\omega_2 + \cos\delta},$$

wherein $\gamma$ is the pitch angle, $\delta$ is an angle of intersection between the first rotation axis and the second rotation axis, $\omega 1$ the first rotation speed and $\omega 2$ the second rotation speed and wherein a contact time function for the contact path is defined by $$t(s,r) = \int_{s_0}^{s} \frac{\frac{\partial k(\sigma,r)}{\partial \sigma} \circ [k(\sigma,r) - c(r)]}{\omega_1[c_y(r)k_x(\sigma,r) - c_x(r)k_y(\sigma,r)]} d\sigma + t_0(r),$$

wherein $k(\sigma, r)$ is the contact path, s is a path parameter, r is a radius at a contact point $s_0$ is a first contact point along the contact path, c is the pitch point, and $t_0$ is a radius-dependent integration constant that depends on the tooth shape for first tooth flanks on the first teeth.

9. The bevel gear drive of claim 8, wherein a contact path is defined for each of two arbitrary radii, and wherein one of the two contact paths is mapped, by centric scaling in relation to the axis intersection point, onto the other contact path or onto a section of the other contact path which includes the pitch point of the other contact path.

10. The bevel gear drive of claim 8, wherein the contact paths are located on a great circle around the axis intersection point, with the great circle including the pitch point.

11. The bevel gear drive of claim 8, wherein the data are determined from contact paths that minimize frictional forces or interrolling noises produced during rotation of the bevel gears.

* * * * *